March 11, 1969  C. W. McCARTY  3,432,698
ADJUSTABLE TORSION MEMBER MECHANISM FOR TORSION MEMBER CLOCKS
Filed Jan. 21, 1966

Inventor:
Clyde W. McCarty.
by Leonard J. Platt
Attorney.

March 11, 1969 C. W. McCARTY 3,432,698
ADJUSTABLE TORSION MEMBER MECHANISM FOR TORSION MEMBER CLOCKS
Filed Jan. 21, 1966

Inventor:
Clyde W. McCarty
by Leonard J. Platt
Attorney.

United States Patent Office 3,432,698
Patented Mar. 11, 1969

3,432,698
ADJUSTABLE TORSION MEMBER MECHANISM FOR TORSION MEMBER CLOCKS
Clyde W. McCarty, Holliston, Mass., assignor to General Electric Company, a corporation of New York
Filed Jan. 21, 1966, Ser. No. 522,252
U.S. Cl. 310—36
Int. Cl. H02k 33/10
6 Claims

ABSTRACT OF THE DISCLOSURE

A mechanism for adjusting the tension of a torsion member in order to adjust the oscillating frequency of the torsion member wherein a resilient means is provided for adjusting one of the supports of the torsion member.

---

This invention relates to torsion member clocks and, more particularly, a mechanism for adjusting the torsion member oscillation frequency in a torsion member clock.

In a torsion member clock, a battery-powered pulse or A.C. permanent magnet motor drives the clock hands at a rate of rotation which is synchronized with and controlled by electrical signals supplied from oscillations of an electromagnetic-mechanical oscillator. The electromagnetic-mechanical oscillator is generally comprised of a torsion member in the form of a wire having a permanently magnetized member mounted thereon. The magnetized member is positioned within a magnetic field which is established by a coil, and the coil is connected to a regenerative feedback circuit which causes the magnetized member and the torsion member to oscillate. The oscillating magnetized member, in turn, induces a signal in the coil which is fed to the motor control circuit to control the motor rate of rotation.

To insure accurate movement of the clock hands, the electromagnetic-mechanical oscillator must be precisely adjusted to a particular frequency, since the motor speed is determined by the oscillation frequency of the electromagnetic-mechanical oscillator. A precise mechanical adjustment is required to adjust the torsion member to an accurate controlling frequency.

It is, therefore, an object of this invention to provide means for adjusting the torsional oscillation which produces an electrical signal for controlling the rate of rotation of a clock motor.

Another object of this invention is to provide a mechanism for providing precise adjustments of the oscillation frequency of a torsion member.

In accordance with this invention, in one form thereof, a clock motor is electrically connected to a torsion member mechanism. The torsion member mechanism includes a torsion member, generally in the form of a wire, having a permanent magnet mounted thereon. The magnet is capable of oscillation with the torsion wire and within a magnetic field established by a coil within which the magnet is disposed. To enable adjustment of the torsion member's oscillation frequency, one end of the torsion wire is secured in a pivotable member. The pivotable member is connected to an adjustable member by resilient means which is arranged so that a relatively large amount of movement is required in the adjustment means to effect only a small amount of change of tension in the torsion member. The unique resilient adjustment mechanism enables accurate adjustment of the torsion wire frequency for controlling the motor rate of rotation.

For a more detailed description of this invention, reference is made to the following specification and the accompanying drawings of which:

Figure 1:
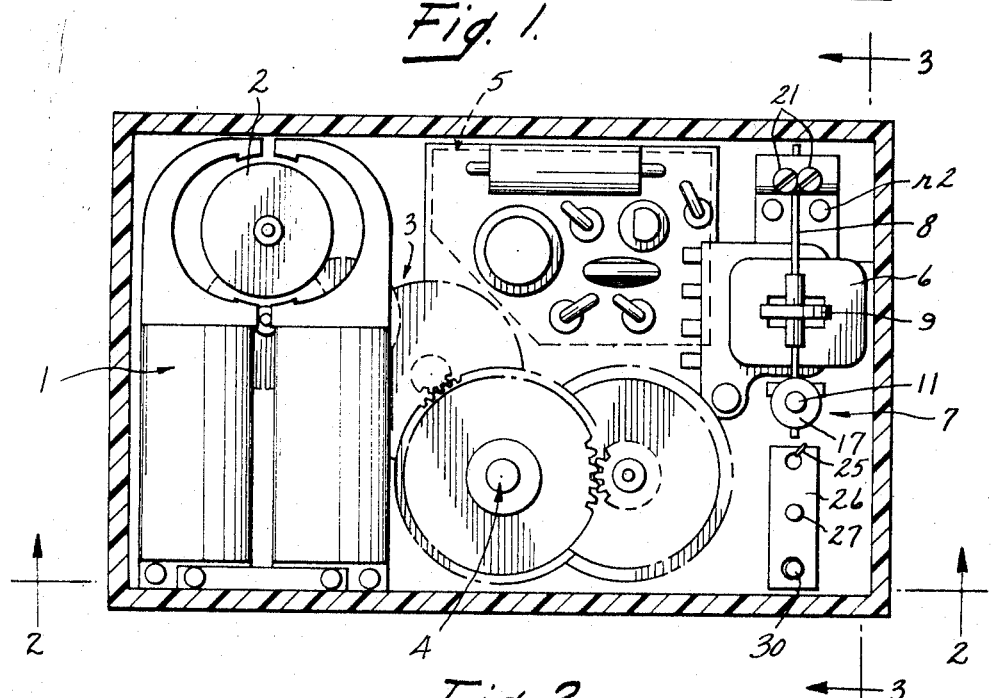
FIG. 1 is an elevation view in section of the over-all torsion member clock.
Figure 2:
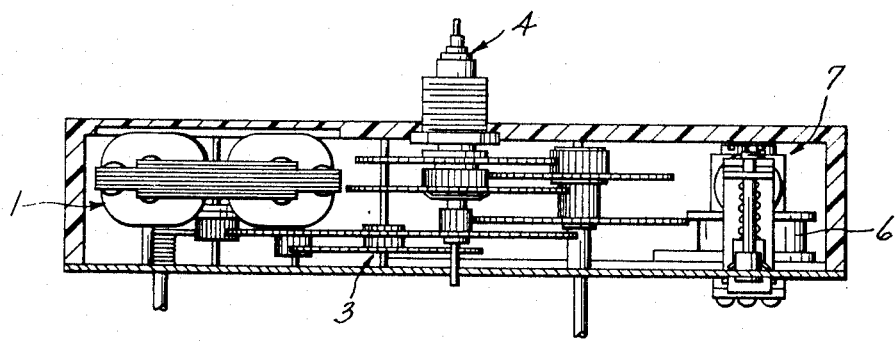
FIG. 2 is a sectional view taken along the line 2—2 of FIG. 1.

Referring to the drawings, the interior mechanism of a torsion wire clock is shown as including a pulse or A.C. permanent magnet motor 1 having a rotor 2 in driving engagement with a gear train 3 for rotating a pair of clock hands through the concentric shaft mechanism 4. An electrical oscillator circuit 5 is provided for controlling the speed of the rotor 2. Electrically connected to the electrical oscillator circuit 5 is a coil 6 positioned adjacent a torsion member mechanism 7.

Figure 3:
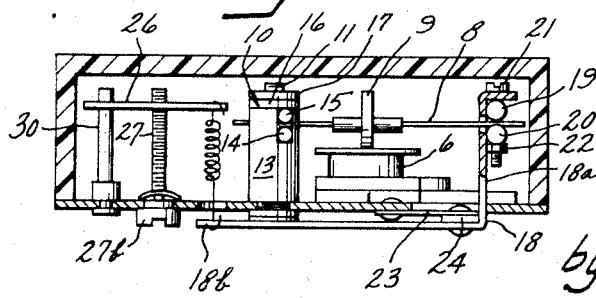
FIG. 3 is a sectional view along the line 3—3 of FIG. 1, showing only the torsion member mechanism.
Figure 4:
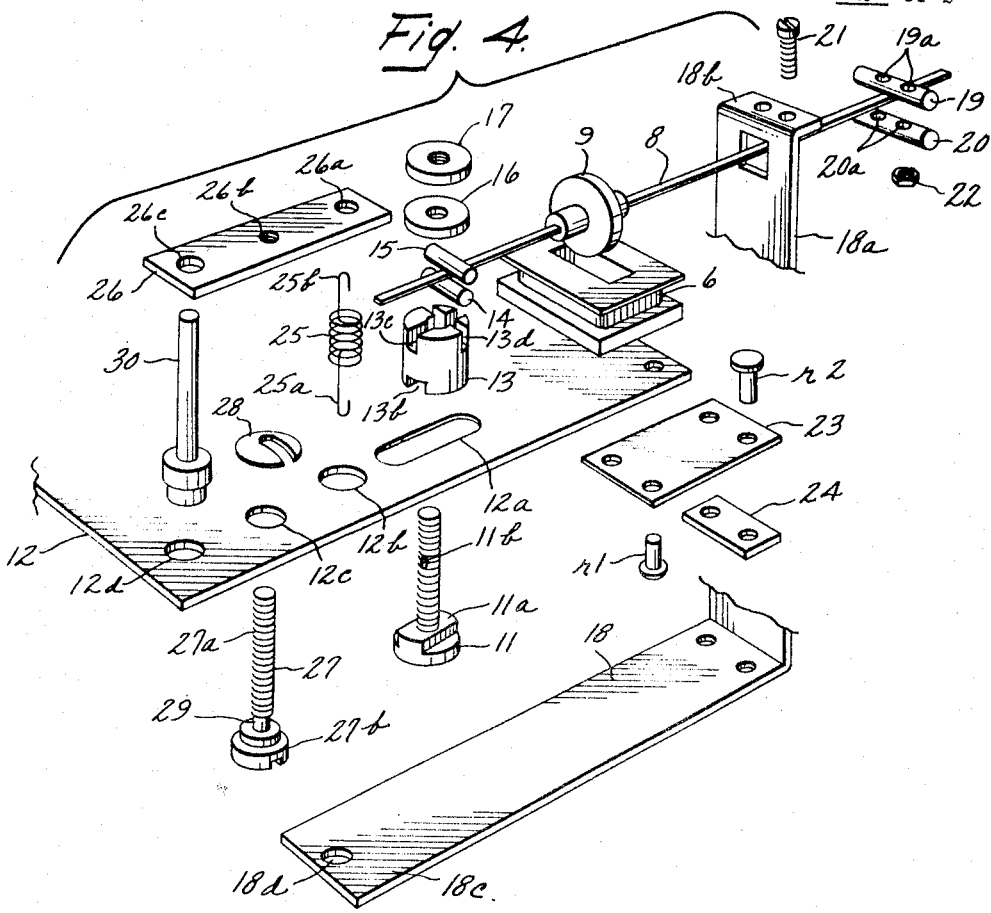
FIG. 4 is an exploded view in perspective of the torsion member mechanism.
Figure 5:
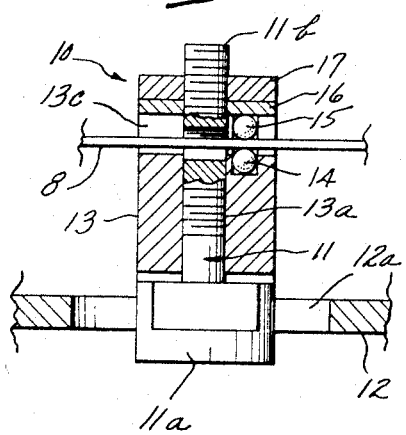
FIG. 5 is a sectional view of the fixed end support for the torsion member.

The torsion member mechanism, as indicated in FIGS. 3 and 4, includes a torsion member, such as a wire 8, upon which a permanent magnet 9 is fixedly secured adjacent the coil 6. One end of the torsion wire 8 is secured in an end support 10, which is illustrated in greater detail in FIG. 5. The end support 10 is comprised of a bolt 11 which is mounted on a mounting member or back plate 12. The bolt 11 has a noncircular projection 11a which is received in an elongated slot or aperture 12a in the mounting member 12 so that the bolt 11 is secured against rotational movement. However, the projection 11a is slidable in the slot 12a for effecting adjustment of the position of the end support 10. A cylindrical-shaped post member 13 has an axial aperture 13a centrally disposed therethrough wherein the threaded portion 11b of the bolt 11 is received when the post 13 is placed over the bolt 11. The bottom surface of the post 13 has a groove 13b for receiving the noncircular portion 11a of the bolt 11 which projects upwardly through the aperture 12a in the mounting member 12, thereby preventing rotational movement of the post 13.

The top surface of the post 13 has a first top groove 13c for receiving the torsion wire 8, and a second top groove 13d oriented transversely to the first top groove 13c and radially spaced from the central aperture 13a. A pair of pins 14 and 15 are received in the groove 13d, the pins being arranged on opposite sides of the torsion wire 8. A washer 16 is disposed around the threaded portion 11b of the bolt 11 and above the post 13, the bottom surface of the washer 16 being in engagement with the top pin 15. A nut 17 is disposed above the washer 16 and is threaded over the threaded portion 11b of the bolt 11. When the nut 17 is advanced downwardly over the threaded portion 11b of the bolt 11, the downwardly directed force on the washer 16 is transmitted to the top pin 15 which, in turn, cooperates with the bottom pin 14 for frictionally engaging the torsion wire 8 to firmly grip the wire.

The opposite end of the torsion wire 8 is secured to a first leg 18a of an L-shaped pivotable member 18 by frictional engagement between a pair of rods 19 and 20. The rods 19 and 20 are secured to a flange 18b on the first leg 18a by bolts 21 which extend downwardly through apertures 19a and 20a in the rods 19 and 20, respectively. The bolts 21 are threaded into nuts 22 for providing compressive force between the rods 19 and 20 and the torsion wire 8. Alternatively, the apertures 20a may be threaded for receiving the bolts 21, thereby eliminating the nuts 22.

The L-shaped pivotable member 18 is mounted to the mounting member 12 by means of an intermediate flexure 23. The flexure 23 is secured to the mounting member 12 by bolts or rivets $r_1$, and the opposite end of the flexure 23 is secured to the corner portion of the L-shaped pivotable member 18 by similar bolts or rivets $r_2$. A spacer 24 is positioned between the corner portion of the L-shaped pivotable member 18 and the flexure 23 in order to allow greater bending freedom for the flexure 23. The flexure 23 is comprised of a thin sheet of resilient metal, such as brass, or of a resilient nonmetal having similar mechanical characteristics.

Movement of the L-shaped member 18 about the flexure 23 for effecting a change in tension of the torsion wire 8 is accomplished by moving the second leg 18c of the L-shaped member 18 relative to the mounting member 12. For effecting movement of the second leg 18c, a first hooked end 25a of a resilient means, in the form of a helical tension spring 25, is received in an aperture 18d. The helical spring 25 extends upwardly through an aperture 12b in the mounting member 12 and a second hooked end 25b thereof engages a first aperture 26a in an adjusting plate 26. The adjusting plate 26 is actuated by an adjusting bolt 27 which projects through an aperture 12c in the mounting member 12. The adjusting bolt 27 has a threaded shank portion 27a which is received in a threaded aperture 26b in the adjusting plate 26. The head 27b of the adjusting bolt 27 is maintained in engagement with the mounting member 12 by a spring retainer 28 received in a groove 29 in the bolt 27. The spring retainer 29 also frictionally maintains the bolt in its adjusted position. The adjusting plate 26, is therefore, raised and lowered relative to the frame 12 upon rotation of the adjusting bolt 27. The adjusting plate 26 is secured against rotation with the adjusting bolt 27 by a guide pin 30 which is secured in an aperture 12d in the mounting member 12 by a forced-fit or weld and has slidable engagement in a third aperture 26c through the adjusting plate 26.

Adjustment of the torsion wire frequency is accomplished in the following manner. One end of the wire 8 is inserted between the two rods 19 and 20, and thereafter frictionally engaged therebetween by tightening the bolts 21 and the nuts 22. The other end of the torsion wire 8 is then inserted between the pins 14 and 15 within the post 13. The length of torsion wire 8 is adjusted by moving the support 10 along the slot 12a to achieve substantially the desired frequency of oscillation. The nut 17 is then advanced downwardly against the washer 16 to force the pins 14 and 15 into frictional engagement with the torsion wire 8 to secure the support 10 in the adjusted position and to firmly grip this end of the torsion wire.

Fine adjustment of the torsion wire frequency of oscillation is accomplished by adjustment of the tension on the torsion wire. This tension adjustment is effected by inserting a screwdriver into the adjusting bolt head 27b and turning the adjusting bolt 27 to raise or lower the adjusting plae 26 to thereby exert a pivoting force on the L-shaped pivotable member 18 through the helical spring 25.

The interposition of the helical spring 25 between the adjusting plate 26 and the pivotable member 18 permits a very sensitive, fine adjustment of the tension on the torsion member 8. It can be seen, for example, that upward movement of the adjusting plate gradually builds up a tensile force in the spring 25 which is transmitted through the member 18 to the torsion wire 8. By choosing a relatively soft spring a substantial adjustment movement of the adjusting plate 26 is necessary to secure a relatively small change in the force applied to the end of the torsion wire 8. Accordingly, a small change in the tension on the torsion member and hence a small change in the frequency of oscillation of the torsion member occures for a relatively large movement of the adjusting bolt 11, thereby providing very fine, sensitive adjustment of frequency. The sensitivity can be further increased by providing relatively fine threads on the bolt 11, so that substantial rotation of the bolt is required for relatively small movement of the adjusting plate 26.

Hence, by employing the unique adjustable torsion wire mechanism as disclosed above the tension of the torsion wire and, therefore, the frequency of the electromagnetic-mechanical oscillator may be precisely adjusted to achieve accurate control of the speed of the clock motor to thereby provide increased accuracy of the clock.

As is evident from the foregoing description, certain aspects of this invention are not limited to the particular construction details of the example illustrated, and it is contemplated that various other modifications and applications will occur to those skilled in the art and to those who employ the invention. It is therefore intended that the appended claims shall encompass all modifications and applications which do not depart from the true spirit and scope of this invention.

What I claim as new and desire to secure by Letters Patent of the United States is:

1. In a torsion member clock having an electric motor, an adjustable electromagnetic-mechanical oscillator for controlling the speed of the electric motor comprising:
    (a) a torsion member, said torsion member having a magnet mounted thereon for torsional oscillation within a magnetic field,
    (b) a first support for securing one end of said torsion member,
    (c) a second support for securing the opposite end of said torsion member,
    (d) resilient means for adjusting said second support to vary the tension in said torsion member for adjusting the oscillation frequency of said torsion member, and
    (e) said second support being comprised of a pivotable member, said torsion member being secured to a first portion of said pivotable member, and said resilient means being secured to a second portion of said pivotable member.

2. In a torsion member clock having an electric motor, an adjustable electromagnetic-mechanical oscillator for controlling the speed of the electric motor comprising:
    (a) a torsion member, said torsion member having a magnet mounted thereon for torsional oscillation within a magnetic field,
    (b) a first support for securing one end of said torsion member,
    (c) a second support for securing the opposite end of said torsion member,
    (d) resilient means for adjusting said second support to vary the tension in said torsion member for adjusting the oscillation frequency of said torsion member, and
    (e) said movable support being comprised of a pivotable L-shaped member having a first leg and a second leg said L-shaped member being movably supported at substantially the corner portion thereof, and said torsion member being secured to said first leg, and said resilient means being secured to said second leg.

3. In a torsion member clock having an electric motor, an adjustable electromagnetic-mechanical oscillator for controlling the speed of the electric motor comprising:
    (a) a torsion member, said torsion member having a magnet mounted thereon for torsional oscillation within a magnetic field,
    (b) a first support for securing one end of said torsion member,
    (c) a second support for securing the opposite end of said torsion member,
    (d) resilient means for adjusting said second support to vary the tension in said torsion member for adjusting the oscillation frequency of said torsion member, and
    (e) said movable support being comprised of a pivotable L-shaped member, and further including a mounting member, a flexure, first securing means for securing one end of said flexure to said mounting member, and second securing means for securing the other end of said flexure to said L-shaped member substantially at the corner portion thereof.

4. An adjustable electromagnetic-mechanical oscillator as recited in claim 3 and further including a spacer positioned between said other end of said flexure and said L-shaped member.

5. In a torsion member clock having an electric motor, an adjustable electromagnetic-mechanical oscillator for controlling the speed of the electric motor comprising:
 (a) a torsion member, said torsion member having a magnet mounted thereon for torsional oscillation within a magnetic field,
 (b) a first support for securing one end of said torsion member,
 (c) a second support for securing the opposite end of said torsion member,
 (d) resilient means for adjusting said second support to vary the tension in said torsion member for adjusting the oscillation frequency of said torsion member, and
 (e) said resilient means including an adjusting plate, said adjusting plate having a first aperture and a second threaded aperture, a guide pin projecting upwardly through said first aperture for slidably guiding said adjusting plate, a threaded adjusting bolt having threaded engagement in said second threaded aperture for effecting movement of said adjusting plate, and a spring, one end of said spring engaging said adjusting plate and the other end of said spring engaging said second support so that the movement of said adjusting plate develops an adjusting force in said spring which is transmitted to said second support.

6. In a torsion member having an electric motor, an adjustable electromagnetic-mechanical oscillator for controlling the speed of the electric motor comprising:
 (a) a torsion member, said torsion member having a magnet mounted thereon for torsional oscillation within a magnetic field,
 (b) a first support for securing one end of said torsion member,
 (c) a second support for securing the opposite end of said torsion member, said second support comprising a pivotable L-shaped member,
 (d) a mounting member,
 (e) a flexure,
 (f) first securing means for securing one end of said flexure to said mounting member,
 (g) second securing means for securing the other end of said flexure to said L-shaped member substantially at the corner portion thereof,
 (h) means for adjusting said second support to vary the tension in said torsion member for adjusting the oscillation frequency of said torsion member,
 (j) said adjusting means including an adjusting plate, said adjusting plate having a first aperture and a second, threaded aperture, a guide pin projecting upwardly through said first aperture for slidably guiding said adjustable plate, a threaded adjusting bolt engaging said mounting member and having threaded engagement in said second aperture for effecting movement of said adjusting plate, and a helical spring having one end engaging said adjusting plate and the other end engaging said L-shaped member, the adjusting force being transmitted from said adjusting plate to said second support through said spring for providing a fine adjustment of the frequency of said torsion member.

References Cited
UNITED STATES PATENTS 3,008,070  11/1961  Nemeth _____ 335—276
2,815,477  12/1957  Dunn et al. _____ 331—154

MILTON O. HIRSHFIELD, *Primary Examiner.*

D. F. DUGGAN, *Assistant Examiner.*

U.S. Cl. X.R.

331—154; 58—23; 318—341